US009672832B2

(12) United States Patent
Toguri et al.

(10) Patent No.: US 9,672,832 B2
(45) Date of Patent: Jun. 6, 2017

(54) AUDIO ENCODER, AUDIO ENCODING METHOD AND PROGRAM

(75) Inventors: Yasuhiro Toguri, Kanagawa (JP); Yuuji Maeda, Tokyo (JP); Jun Matsumoto, Kanagawa (JP); Shiro Suzuki, Kanagawa (JP); Yuuki Matsumura, Saitama (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 13/493,850

(22) Filed: Jun. 11, 2012

(65) Prior Publication Data

US 2013/0003980 A1 Jan. 3, 2013

(30) Foreign Application Priority Data

Jul. 1, 2011 (JP) ................................ 2011-147421
Oct. 20, 2011 (JP) ................................ 2011-230330

(51) Int. Cl.

*H04R 5/00* (2006.01)
*G10L 19/008* (2013.01)
*H04S 1/00* (2006.01)
*H04B 1/00* (2006.01)

(52) U.S. Cl.

CPC ............ *G10L 19/008* (2013.01); *H04S 1/007* (2013.01); *H04S 2400/09* (2013.01)

(58) Field of Classification Search

CPC .. H04S 2420/03; H04S 2420/07; H04S 1/007; H04S 2400/09; G10L 19/008
USPC ...................... 381/22, 23.1, 58, 56; 700/94; 375/240.12; 704/500
See application file for complete search history.

(56) References Cited

U.S. PATENT DOCUMENTS 6,771,777 B1 * 8/2004 Gbur et al. ...................... 381/2

FOREIGN PATENT DOCUMENTS

| | | | | |
|---|---|---|---|---|
| JP | 11032399 A | * | 2/1999 | ............ H04B 1/667 |
| JP | 2002244698 A | * | 8/2002 | |
| JP | 3421726 | | 4/2003 | |
| JP | 2004325633 A | * | 11/2004 | |
| JP | 3622982 | | 12/2004 | |
| JP | 3951690 | | 5/2007 | |

* cited by examiner

*Primary Examiner* — Vivian Chin
*Assistant Examiner* — Ammar Hamid
(74) *Attorney, Agent, or Firm* — Paratus Law Group, PLLC

(57) ABSTRACT

There is provided an audio encoder comprising a determination part determining, based on frequency spectra of audio signals of a plurality of channels, a mixing ratio as a ratio, relative to a frequency spectrum after mixing for each channel of the plurality of channels, of the frequency spectrum for another channel, a mixing part mixing the frequency spectra of the plurality of channels for each channel based on the mixing ratio determined by the determination part, and an encoding part encoding the frequency spectra of the plurality of channels after mixing by the mixing part.

21 Claims, 7 Drawing Sheets

AUDIO ENCODER, AUDIO ENCODING METHOD AND PROGRAM

BACKGROUND

The present technology relates to an audio encoder, an audio encoding method and a program, and particularly relates to an audio encoder, an audio encoding method and a program capable of preventing deterioration of sound quality due to encoding when encoding audio signals of a plurality of channels in high efficiency.

Among known techniques for encoding stereo audio signals constituted of audio signals of a plurality of channels are an M/S stereo encoding technique which enhances encoding efficiency by taking advantage of relationship between the channels, an intensity stereo encoding technique, and the like. Hereinafter, the number of the channels of the stereo audio signals is two of a channel for the left and a channel for the right for convenience of explanation, but the same explanation can be applied to the case that the number is three or more.

The M/S stereo encoding generates components of a sum of and a difference between the audio signals of the channels for the right and left constituting the stereo audio signals as encoding results. Accordingly, since the component of the difference is small when the audio signals of the channels for the right and left are similar to each other, encoding efficiency is high. However, since the component of the difference is large when the audio signals of the channels for the right and left are significantly different from each other, it is difficult to attain high encoding efficiency. This can cause quantization noise in quantization after the encoding and thus, artificial noise in decoding.

In the intensity stereo encoding, the encoding is performed based on the principles that human auditory sensation is dull of phases in a high-frequency region, and that positions are sensed mainly based on level ratios between frequency spectra (for example, see ISO/IEC 13818-7 Information technology "Generic coding of moving pictures and associated audio information Part 7", Advanced Audio Coding (AAC)). Specifically, as for frequencies below a predetermined frequency $F_{IS}$, the intensity stereo encoding affords frequency spectra of the channels for the right and left as the encoding results as they are. On the other hand, as for frequencies equal to or greater than the predetermined frequency $F_{IS}$, it generates a common spectrum obtained by mixing the frequency spectra of the channels for the right and left and levels of the frequency spectra of the individual channels as the encoding results.

Accordingly, as for the frequencies below the frequency $F_{IS}$, a decoder affords the frequency spectra of the channels for the right and left as the encoding results, as decoding results as they are. On the other hand, as for the frequencies equal to or greater than the frequency $F_{IS}$, it applies the levels of the frequency spectra of the individual channels to the common spectrum as the encoding result to generate the decoding results.

Also for such intensity stereo encoding, the premise is that the audio signals of the channels for the right and left are similar to each other similarly to the case of the M/S stereo encoding. Accordingly, when the audio signals of the channels for the right and left are completely different from each other, for example, when the audio signal of the channel for the left is an audio signal of the cymbals and the audio signal of the channel for the right is an audio signal of the trumpet, since the common spectrum is different from the frequency spectra of the channels for the right and left, artificial noise can arise in decoding.

Therefore, it is proposed that a scale of a distance between frequency spectra of audio signals of channels for the right and left is calculated, and that when this scale is equal to or smaller than a threshold value common encoding such as the M/S stereo encoding is performed and when it is equal to or greater than the threshold value encoding is performed individually (for example, see Japanese Patent No. 3421726 which is hereinafter referred to as Patent Document 1).

Moreover, it is also proposed that frequency spectra of stereo audio signals are divided into pieces for predetermined frequency bands, and that, for each frequency band, the index to which intensity stereo encoding is applied is transmitted using a specific Huffman codebook number (for example, see Japanese Patent No. 3622982 which is hereinafter referred to as Patent Document 2). Thereby, the intensity stereo encoding can be switched between turning ON and OFF for each predetermined frequency band.

However, in the cases of the technologies of Patent Documents 1 and 2, when the common encoding or the intensity stereo encoding is frequently switched between turning ON and OFF, the sensing positions can become unstable or abnormal sound can arise.

Moreover, there are situations that high compression ratio is desirable for encoding. The situation can forcibly require employing the intensity stereo encoding for enhancing encoding efficiency even when the audio signals of the channels for the right and left are significantly different from each other. In this case, definitely sensible artificial noise can arise in decoding.

Meanwhile, it is considered that stereo audio signals, which are divided into pieces for bands, are mixed in mixing ratios based on distortion factors of encoding to be encoded (for example, see Japanese Patent No. 3951690). In this case, since separation of encoding object for the right and left (stereophonic feeling) is continuously controlled based on the distortion factors, the sensing positions can be prevented from being unstable or the occurrence of the abnormal sound can be prevented.

FIG. 1 is a block diagram illustrating one example of a configuration of an audio encoder performing such encoding.

The audio encoder 10 in FIG. 1 is configured to include a filter bank 11, a filter bank 12, an adaptive mixing part 13, a T/F transformation part 14, a T/F transformation part 15, an encoding control part 16, an encoding part 17, a multiplexer 18 and a distortion factor detection part 19.

To the audio encoder 10 in FIG. 1, an audio signal $x_L$ as a time signal of a left channel and an audio signal $x_R$ as a time signal of a right channel are inputted as stereo audio signals of an encoding object.

The filter bank 11 of the audio encoder 10 divides the audio signal $x_L$ inputted as the encoding object into audio signals for respective B frequency bands (bands). The filter bank 11 supplies the divided subband signals $x^b_L$ with a band number b (b=1, 2, . . . , B) to the adaptive mixing part 13.

Similarly, the filter bank 12 divides the audio signal $x_R$ inputted as the encoding object into audio signals for respective B bands. The filter bank 12 supplies the divided subband signals $x^b_R$ with a band number b (b=1, 2, . . . , B) to the adaptive mixing part 13.

The adaptive mixing part 13 determines mixing ratios of the subband signals $x^b_L$ supplied from the filter bank 11 and the subband signals $x^b_R$ supplied from the filter bank 12 based on distortion factors which are supplied from the distortion factor detection part 19 and are used in encoding of the past encoding objects.

Specifically, the adaptive mixing part 13 makes the mixing ratio larger as the distortion factor is larger, that is, an S/N ratio is smaller. Thereby, separation (stereophonic feeling) of the subband signals, which are to be obtained by mixing, for the right and left becomes small, and encoding efficiency is to be enhanced. On the other hand, the adaptive mixing part 13 makes the mixing ratio smaller as the distortion factor is smaller, that is, the S/N ratio is larger. Thereby, the separation (stereophonic feeling) of the subband signals, which are to be obtained by the mixing, for the right and left becomes large.

The adaptive mixing part 13 mixes the subband signal $x^b_L$ and the subband signal $x^b_R$ for each band based on the mixing ratio of the determined subband signal $x^b_L$ to generate a subband signal $x^b_{Lmix}$. Similarly, the adaptive mixing part 13 mixes the subband signal $x^b_L$ and the subband signal $x^b_R$ for each band based on the mixing ratio of the determined subband signal $x^b_R$ to generate a subband signal $x^b_{Rmix}$. The adaptive mixing part 13 supplies the generated subband signals $x^b_{Lmix}$ to the T/F transformation part 14 and supplies the subband signals $x^b_{Rmix}$ to the T/F transformation part 15.

The T/F transformation part 14 performs time-frequency transformation such as MDCT (Modified Discrete Cosine Transform) on the subband signals $x^b_{Lmix}$ and supplies the resulting frequency spectrum $X_L$ to the encoding control part 16 and the encoding part 17.

Similarly, the T/F transformation part 15 performs the time-frequency transformation such as the MDCT on the subband signals $x^b_{Rmix}$ and supplies the resulting frequency spectrum $X_R$ to the encoding control part 16 and the encoding part 17.

The encoding control part 16 selects any one encoding scheme of dual encoding, M/S stereo encoding and intensity encoding based on a correlation between the frequency spectrum $X_L$ supplied from the T/F transformation part 14 and the frequency spectrum $X_R$ supplied from the T/F transformation part 15. The encoding control part 16 supplies the selected encoding scheme to the encoding part 17.

The encoding part 17 encodes each of the frequency spectrum $X_L$ supplied from the T/F transformation part 14 and the frequency spectrum $X_R$ supplied from the T/F transformation part 15 using the encoding scheme supplied from the encoding control part 16. The encoding part 17 supplies the encoded spectrum obtained by the encoding and additional information regarding the encoding to the multiplexer 18.

The multiplexer 18 performs multiplexing of the encoded spectrum, additional information regarding the encoding, and the like, supplied from the encoding part 17 in a predetermined format, and outputs the resulting encoded data.

The distortion factor detection part 19 detects a distortion factor in the encoding of the encoding part 17 and supplies it to the adaptive mixing part 13.

SUMMARY

However, in the audio encoder 10 in FIG. 1, since the mixing ratio is determined based on the distortion factors of the past encoding objects, the mixing ratio is not necessarily adapted to features of the present encoding object. As a result, deterioration of sound quality due to encoding can arise. For example, even when the audio signals of the channels for the right and left are significantly different from each other, noise in decoding caused by insufficient mixing of the frequency spectra of the channels for the right and left can arise.

The present technology is devised in view of the aforementioned circumstances, and it is desirable to prevent the deterioration of sound quality due to encoding when encoding stereo audio signals in high efficiency.

According to one aspect of the present technology, there is provided an audio encoder including: a determination part determining, based on frequency spectra of audio signals of a plurality of channels, a mixing ratio as a ratio, relative to a frequency spectrum after mixing for each channel of the plurality of channels, of the frequency spectrum for another channel; a mixing part mixing the frequency spectra of the plurality of channels for each channel based on the mixing ratio determined by the determination part; and an encoding part encoding the frequency spectra of the plurality of channels after mixing by the mixing part.

According to one aspect of the present technology, there are provided an audio encoding method and a program corresponding to an audio encoder according to a first aspect of the present technology.

In one aspect according to the present technology, based on frequency spectra of audio signals of a plurality of channels, a mixing ratio as a ratio, relative to a frequency spectrum after mixing for each channel of the plurality of channels, of the frequency spectrum for another channel is determined; the frequency spectra of the plurality of channels for each channel based on the mixing ratio determined by the determination part are mixed; and the frequency spectra of the plurality of channels after mixing by the mixing part are encoded.

According to one aspect of the present technology, deterioration of sound quality due to encoding can be prevented when encoding audio signals of a plurality of channels in high efficiency.

DETAILED DESCRIPTION OF THE EMBODIMENTS

Embodiment (Constitutional Example of One Embodiment of Audio Encoder)

Figure 2:
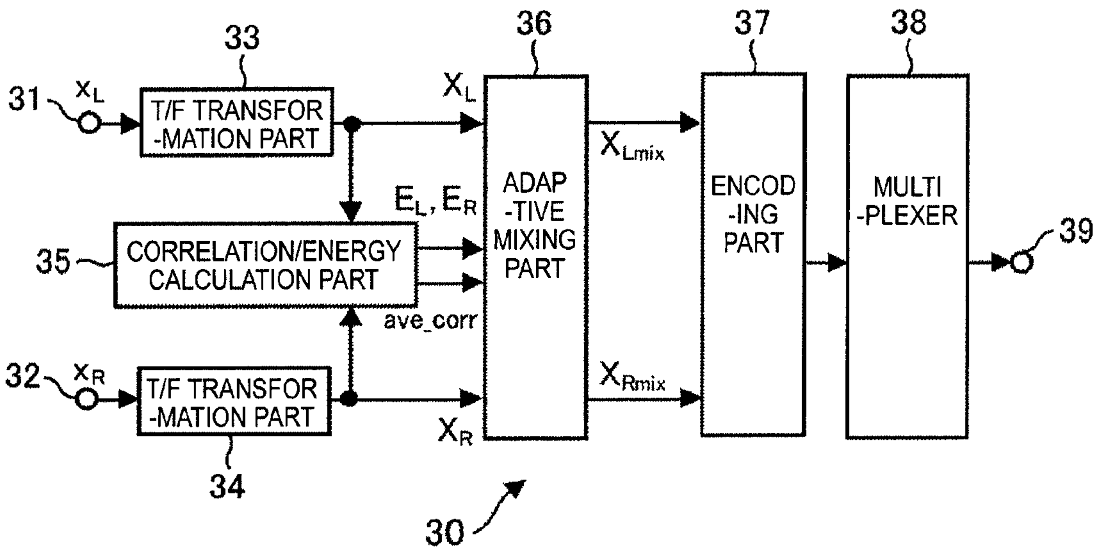
FIG. 2 is a block diagram illustrating a constitutional example of one embodiment of an audio encoder to which the present technology is applied.

FIG. 2 is a block diagram illustrating a constitutional example of one embodiment of an audio encoder to which the present technology is applied.

An audio encoder 30 in FIG. 2 is configured to include an input terminal 31 and an input terminal 32, a T/F transformation part 33 and a T/F transformation part 34, a correlation/energy calculation part 35, an adaptive mixing part 36, an encoding part 37, a multiplexer 38, and an output terminal 39. At a mixing ratio based on frequency spectra of stereo audio signals, the audio encoder 30 mixes the frequency spectra to perform intensity stereo encoding.

Specifically, an audio signal $x_L$ as a time signal of a channel for a left out of the stereo audio signals of an encoding object is inputted to the input terminal 31 of the audio encoder 30, and supplied to the T/F transformation part 33. Moreover, an audio signal $x_R$ as a time signal of a right channel out of the stereo audio signals of the encoding object is inputted to the input terminal 32, and supplied to the T/F transformation part 34.

The T/F transformation part 33 performs time-frequency transformation such as MDCT transformation on the audio signal $x_L$ supplied from the input terminal 31 for each predetermined transformation frame. The T/F transformation part 33 supplies the resulting frequency spectrum $X_L$ (coefficient) to the correlation/energy calculation part 35 and the adaptive mixing part 36.

Similarly, the T/F transformation part 34 performs the time-frequency transformation such as MDCT transformation on the audio signal $x_R$ supplied from the input terminal 32 for each predetermined transformation frame. The T/F transformation part 34 supplies the resulting frequency spectrum $X_R$ (coefficient) to the correlation/energy calculation part 35 and the adaptive mixing part 36.

The correlation/energy calculation part 35 divides each of the frequency spectrum $X_L$ supplied from the T/F transformation part 33 and the frequency spectrum $X_R$ supplied from the T/F transformation part 34 into pieces for respective predetermined frequency bands (bands). In addition, to the individual bands, band numbers b (b=1, 2, . . . , B) are given sequentially in ascending order of frequency.

Moreover, the correlation/energy calculation part 35 calculates energy $E_L(b)$ of the frequency spectrum $X_L$ and energy $E_R(b)$ of the frequency spectrum $X_R$ of the band with a band number b for each band according to the following equation (1).

$$E_L(b) = \sum_{k=K_b}^{K_{b+1}-1} |X_L(k)|^2 \qquad (1)$$

$$E_R(b) = \sum_{k=K_b}^{K_{b+1}-1} |X_R(k)|^2$$

In addition, in equation (1), $X_L(k)$ represents a frequency spectrum $X_L$ of a frequency index k, $X_R(k)$ represents a frequency spectrum $X_R$ of the frequency index k. Moreover, $K_b$ and $K_{b+1}-1$ represent a minimum value and a maximum value of the frequency indices corresponding to the frequencies of the band with a band number b, respectively. This is same as for equation (2) mentioned below.

Further, the correlation/energy calculation part 35 calculates a correlation corr(b) between the frequency spectrum $X_L$ and frequency spectrum $X_R$ for each band using the energy $E_L(b)$ and the energy $E_R(b)$ according to the following equation (2).

$$\mathrm{corr}(b) = \frac{\sum_{k=K_b}^{K_{b+1}-1} X_L(k)X_R(k)}{\sqrt{E_L(b)E_R(b)}} \qquad (2)$$

Although this correlation corr(b) is calculated every time when the frequency spectrum $X_L$ and the frequency spectrum $X_R$ are inputted to the correlation/energy calculation part 35, that is, for every transformation frame, the correlation/energy calculation part 35 performs time smoothing on the correlation corr(b) because of its harsh variation as it is relative to others. Specifically, the correlation/energy calculation part 35 sequentially calculates an average correlation ave_corr(b) by calculating an exponentially weighted average of the correlation corr(b) of the present transformation frame and the correlations corr(b) of a predetermined number of past transformation frames, for example, according to the following equation (3).

$$\mathrm{ave\_corr}(b) = r \times \mathrm{ave\_corr}(b)^{Old} + (1-r) \times \mathrm{corr}(b) \quad (0<r<1) \qquad (3)$$

In equation (3), $\mathrm{ave\_corr}(b)^{Old}$ is an exponentially weighted average for the predetermined number of past transformation frames.

The correlation/energy calculation part 35 supplies the average correlation ave_corr(b), the energy $E_L(b)$ and the energy $E_R(b)$ calculated as above to the adaptive mixing part 36.

The adaptive mixing part 36 calculates a mixing ratio for each band based on the average correlation ave_corr(b), the energy $E_L(b)$ and the energy $E_R(b)$ supplied from the correlation/energy calculation part 35. The mixing ratio is a ratio of the frequency spectrum $X_R$ of the channel for the right (frequency spectrum $X_L$ of the channel for the left) relative to the frequency spectrum $X_{Lmix}$ of the channel for the left (frequency spectrum $X_{Rmix}$ of the channel for the right) after mixing.

The adaptive mixing part 36 mixes the frequency spectrum $X_L$ supplied from the T/F transformation part 33 and the frequency spectrum $X_R$ supplied from the T/F transformation part 34 for each band and channel based on the mixing ratio of each band. The adaptive mixing part 36 supplies the resulting frequency spectrum $X_{Lmix}$ of the channel for the left and the frequency spectrum $X_{Rmix}$ of the channel for the right after the mixing to the encoding part 37.

The encoding part 37 performs intensity stereo encoding on the frequency spectrum $X_{Lmix}$ and the frequency spectrum $X_{Rmix}$ supplied from the adaptive mixing part 36. The encoding part 37 supplies the encoded spectrum obtained by the encoding and additional information regarding the encoding to the multiplexer 38.

The multiplexer 38 performs multiplexing of the encoded spectrum, the additional information regarding the encoding, and the like, supplied from the encoding part 37 in a predetermined format to output the resulting encoded data via the output terminal 39.

Although the correlation corr(b) undergoes the time smoothing in the audio encoder 30 above, the time smoothing may not be employed, making r in the above-mentioned equation (3) 0. Moreover, the energy $E_L(b)$ and the energy $E_R(b)$ may also undergo the time smoothing same as the correlation corr(b).

Although the encoding part 37 performs the intensity stereo encoding in the audio encoder 30 above, highly efficient encoding such as M/S stereo encoding other than the intensity stereo encoding may be employed.

(Explanation of Bands)

Figure 3:
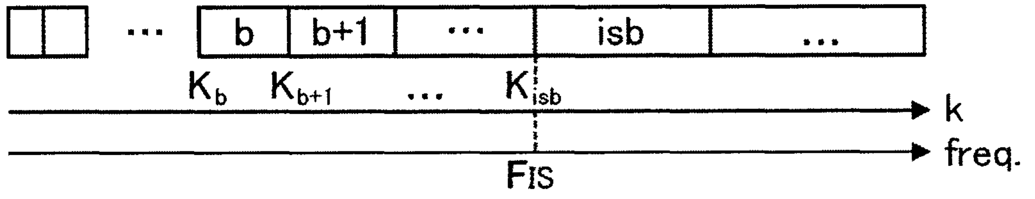
FIG. 3 is a diagram for explaining bands in a correlation/energy calculation part in FIG. 2.

FIG. 3 is a diagram for explaining bands in the correlation/energy calculation part 35 in FIG. 2.

As illustrated in FIG. 3, each band is a bandwidth of predetermined frequencies. For example, in FIG. 3, a band with a band number b is a bandwidth which includes frequencies equal to or greater than a frequency corresponding to a frequency index $K_b$ and smaller than a frequency corresponding to a frequency index $K_{b+1}$.

Moreover, in the example in FIG. 3, a band number for a lowermost band out of bands, frequency spectra for the right and left of which do not become encoding results as they are in the intensity stereo encoding, (hereinafter, referred to as starting band) is isb. Further, a minimum frequency index for the band with the band number isb is $K_{isb}$, and a frequency for the frequency index $K_{isb}$ is $F_{IS}$.

In addition, preferably, the bands in the correlation/energy calculation part 35 are configured to be wider in band range as going to a higher frequency region when divided in accordance with the critical bandwidth of auditory sensation (auditory critical band). Moreover, a range of the band may equal a range of a quantization unit as a processing unit of quantization or encoding in the encoding part 37, or be different from it. Frequencies equal to or greater than $F_{IS}$ may constitute just one band without division into bands.

(Constitutional Example of Adaptive Mixing Part)

Figure 4:
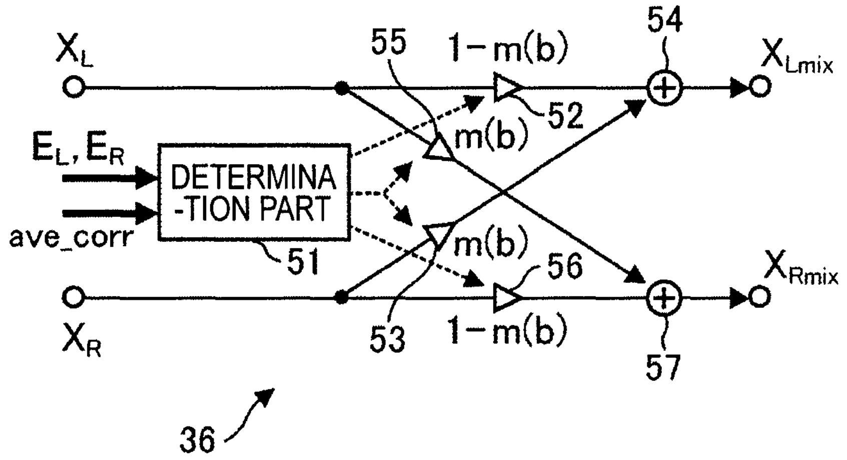
FIG. 4 is a diagram illustrating a constitutional example of an adaptive mixing part in FIG. 2.

FIG. 4 is a diagram illustrating a constitutional example of the adaptive mixing part 36 in FIG. 2.

The adaptive mixing part 36 in FIG. 4 is configured to include a determination part 51, a multiplication part 52, a multiplication part 53, an addition part 54, a multiplication part 55, a multiplication part 56 and an addition part 57.

The determination part 51 calculates a mixing ratio m(b) of each band using the energy $E_L(b)$, the energy $E_R(b)$ and the average correlation ave_corr(b) of the band supplied from the correlation/energy calculation part 35 in FIG. 2. The determination part 51 supplies the calculated mixing ratio m(b) to the multiplication part 52, the multiplication part 53, the multiplication part 55 and the multiplication part 56.

The multiplication part 52, the multiplication part 53 and the addition part 54 function as a mixing part for the channel for the left, and the multiplication part 55, the multiplication part 56 and the addition part 57 function as a mixing part for the channel for the right.

Specifically, the multiplication part 52, the multiplication part 53 and the addition part 54 perform mixing based on the mixing ratio m(b) according to the following equation (4) to generate the frequency spectrum $X_{Lmix}$ after the mixing. Moreover, the multiplication part 55, the multiplication part 56 and the addition part 57 perform mixing based on the mixing ratio m(b) according to the following equation (4) to generate the frequency spectrum $X_{Rmix}$ after the mixing.

$$X_{Lmix}(k)=(1-m(b))\times X_L(k)+m(b)\times X_R(k)$$

$$X_{Rmix}(k)=m(b)\times X_L(k)+(1-m(b))\times X_R(k) \quad (4)$$

In equation (4), a frequency index k is a frequency index for frequencies included in the band with a band number b. Moreover, in equation (4), $X_{Lmix}(k)$ and $X_{Rmix}(k)$ are a frequency spectrum $X_{Lmix}$ and a frequency spectrum $X_{Rmix}$ of the frequency index k, respectively. Further, $X_L(k)$ and $X_R(k)$ are a frequency spectrum $X_L$ and a frequency spectrum $X_R$ of the frequency index k.

In more detail, the multiplication part 52 multiplies, for each band, the frequency spectrum $X_L$ supplied from the T/F transformation part 33 in FIG. 2 and a value obtained by subtraction of the mixing ratio m(b) supplied from the determination part 51 from 1 to supply the resulting frequency spectrum to the addition part 54.

Moreover, the multiplication part 53 multiplies, for each band, the frequency spectrum $X_R$ supplied from the T/F transformation part 34 in FIG. 2 and the mixing ratio m(b) supplied from the determination part 51 to supply the resulting frequency spectrum to the addition part 54.

The addition part 54 adds, for each band, the frequency spectrum supplied from the multiplication part 52 and the frequency spectrum supplied from the multiplication part 53. The addition part 54 supplies the frequency spectrum obtained by the addition as the frequency spectrum $X_{Lmix}$ after the mixing to the encoding part 37 in FIG. 2.

Moreover, the multiplication part 55 multiplies, for each band, the frequency spectrum $X_L(b)$ supplied from the T/F transformation part 33 and the mixing ratio m(b) supplied from the determination part 51 to supply the resulting frequency spectrum to the addition part 57.

The multiplication part 56 multiplies, for each band, the frequency spectrum $X_R(b)$ supplied from the T/F transformation part 34 and a value obtained by subtraction of the mixing ratio m(b) supplied from the determination part 51 from 1 to supply the resulting frequency spectrum to the addition part 57.

The addition part 57 adds, for each band, the frequency spectrum supplied from the multiplication part 55 and the frequency spectrum supplied from the multiplication part 56. The addition part 57 supplies the frequency spectrum obtained by the addition as the frequency spectrum $X_{Rmix}$ after the mixing to the encoding part 37.

(Explanation of Calculating Method of Mixing Ratio)

Figure 5:
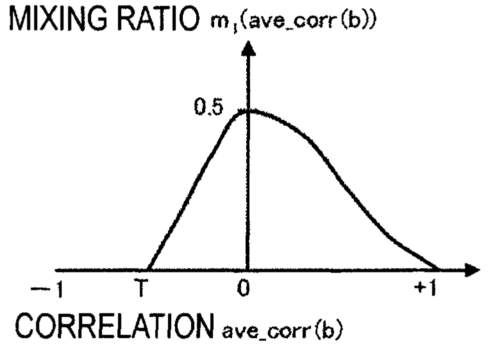
FIG. 5 is a diagram illustrating an example of a mixing ratio $m_1$.
Figure 6:
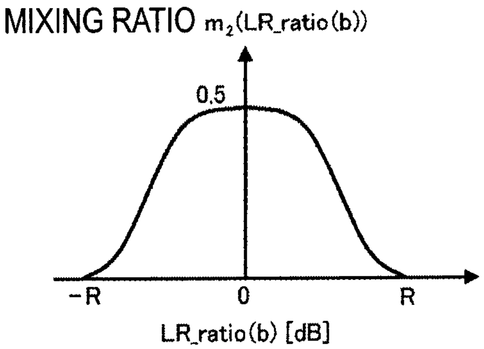
FIG. 6 is a diagram illustrating an example of a mixing ratio $m_2$.
Figure 7:
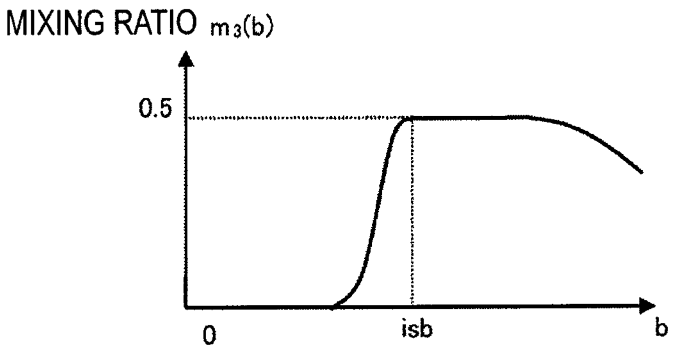
FIG. 7 is a diagram illustrating an example of a mixing ratio $m_3$.

FIG. 5 to FIG. 7 are diagrams for explaining calculating method of the mixing ratio in the determination part 51 in FIG. 4.

The determination part 51 determines, for each band, for example, a mixing ratio $m_1$(ave_corr(b)) illustrated in FIG. 5 based on an average correlation ave_corr(b). In FIG. 5, the horizontal axis represents the average correlation ave_corr (b) and the vertical axis represents the mixing ratio $m_1$(ave_corr(b)).

When the average correlation ave_corr(b) is close to 0, a frequency spectrum $X_L$ and a frequency spectrum $X_R$ are different from each other. Therefore, it is desirable to prevent the different encoding objects for channels for the right and left from causing noise in decoding. On the other hand, when the average correlation ave_corr(b) is close to 1, the frequency spectrum $X_L$ and the frequency spectrum $X_R$ are similar to each other. The noise in decoding due to encoding hardly arises. Accordingly, in the example in FIG. 5, the mixing ratio $m_1$(ave_corr(b)) becomes larger as the average correlation ave_corr(b) is closer to 0 and smaller as the average correlation ave_corr(b) is closer to 1. Moreover, when the average correlation ave_corr(b) equals 0, the mixing ratio $m_1$(ave_corr(b)) is 0.5 as a maximum value.

Meanwhile, when the average correlation ave_corr(b) is a negative value, it becomes larger as the average correlation ave_corr(b) is closer to 0 and smaller as the average correlation ave_corr(b) is closer to −1 similarly to the case that the average correlation ave_corr(b) is a plus value. However, in this case, since the energy is attenuated by the mixing, the mixing ratio $m_1$(ave_corr(b)) is smaller compared with the one in the case that the average correlation ave_corr(b) is a plus value. Moreover, when the average correlation ave_corr (b) is smaller than a predetermined negative threshold value T larger than −1 (for example, approximately −0.6), the mixing ratio $m_1$(ave_corr(b)) is 0.

In addition, the mixing ratio $m_1$(ave_corr(b)) may be determined as indicated in the following equation (5).

$$m_1(\text{ave\_corr}(b))=0, \text{ when ave\_corr}(b)\leq C1,$$

$$m_1(\text{ave\_corr}(b))=0.5\times(\text{ave\_corr}(b)-C1)/(C2-C1), \text{ when } C1<\text{ave\_corr}(b)\leq C2, \text{ and}$$

$$m_1(\text{ave\_corr}(b))=0.5\times(\text{ave\_corr}(b)-1)/(C2-1), \text{ when ave\_corr}(b)>C2 \quad (5)$$

In equation (5), C1 and C2 are predetermined threshold values. For example, C1 can be −0.6 and C2 can be 0.

Moreover, the determination part 51 determines, for each band, for example, the mixing ratio $m_2$(LR_ratio(b)) illustrated in FIG. 6 based on energies $E_L$(b) and $E_R$(b).

In FIG. 6, the horizontal axis represents a level ratio LR_ratio(b) [dB] of frequency spectra of the channels for the right and left defined by the following equation (6) based on the energies $E_L$(b) and $E_R$(b), and the vertical axis represents the mixing ratio $m_2$(LR_ratio(b)).

$$\text{LR\_ratio}(b)=10\log_{10}(E_L/E_R) \quad (6)$$

In the example in FIG. 6, as an absolute value of the level ratio LR_ratio is larger, that is, as levels of the frequency spectrum $X_L$ and the frequency spectrum $X_R$ are more different, the mixing ratio $m_2$(LR_ratio(b)) becomes smaller for the purpose of preventing sound leakage (described below in detail). And, when the absolute value of the level ratio LR_ratio is equal to or greater than a predetermined threshold value R (approximately 30 dB), the mixing ratio $m_2$(LR_ratio(b)) is 0.

However, when sound of at least one of the channels for the right and left is nearly soundless, that is, when at least one level of the frequency spectrum $X_L$ and frequency spectrum $X_R$ is smaller than a predetermined threshold value, the sound leakage is sensible. Therefore, regardless of the level ratio LR_ratio, the mixing ratio $m_2$(LR_ratio(b)) is made 0.

The sound leakage is caused by mixing frequency spectra of audio signals which are significantly different from each other in level, and is level shift from a frequency spectrum large in level to a frequency spectrum small in level.

Further, the determination part 51 determines a mixing ratio $m_3$(b), for example, illustrated in FIG. 7 based on frequencies of bands. In FIG. 7, the horizontal axis represents a band number b and the vertical axis represents the mixing ratio $m_3$(b).

When the mixing steeply starts from the band with the band number isb as a starting band, noise can arise due to discontinuity. Therefore, in the example in FIG. 7, the mixing ratio $m_3$(b) gradually increases up to 0.5 as the maximum value, starting from a band with a band number slightly prior to the band number isb. Moreover, in a higher frequency region (for example, frequencies of 13 kHz or more), since noise in decoding is hardly to be sensed, the mixing ratio $m_3$(b) is slightly smaller than 0.5 in order to keep the stereophonic feeling even when the frequency spectrum $X_L$ and the frequency spectrum $X_R$ are different from each other.

The determination part 51 determines the eventual mixing ratio m(b) of the band b according to the following equation (7), using the mixing ratios $m_1$(ave_corr(b)), $m_2$(LR_ratio (b)) and $m_3$(b) calculated as above.

$$m(b)=4\times m_1(\text{ave\_corr}(b))\times m_2(\text{LR\_ratio}(b))\times m_3(b) \quad (7)$$

In addition, the mixing ratio m(b) may not be the product of the mixing ratios $m_1$(ave_corr(b)), $m_2$(LR_ratio(b)) and $m_3$(b), but a linear sum of the mixing ratios $m_1$(ave_corr(b)), $m_2$(LR_ratio(b)) and $m_3$(b) as described in the following equation (8).

$$m(b)=w_1\times m_1(\text{ave\_corr}(b))+w_2\times m_2(\text{LR\_ratio}(b))+w_3\times m_3(b), \text{ where } w_1+w_2+w_3=1 \quad (8)$$

Moreover, the mixing ratio m(b) is not necessarily determined using all the mixing ratios $m_1$(ave_corr(b)), $m_2$(LR_ratio(b)) and $m_3$(b), but may be determined using at least one of the mixing ratios $m_1$(ave_corr(b)), $m_2$(LR_ratio(b)) and $m_3$(b).

(Constitutional Example of Encoding Part)

Figure 8:
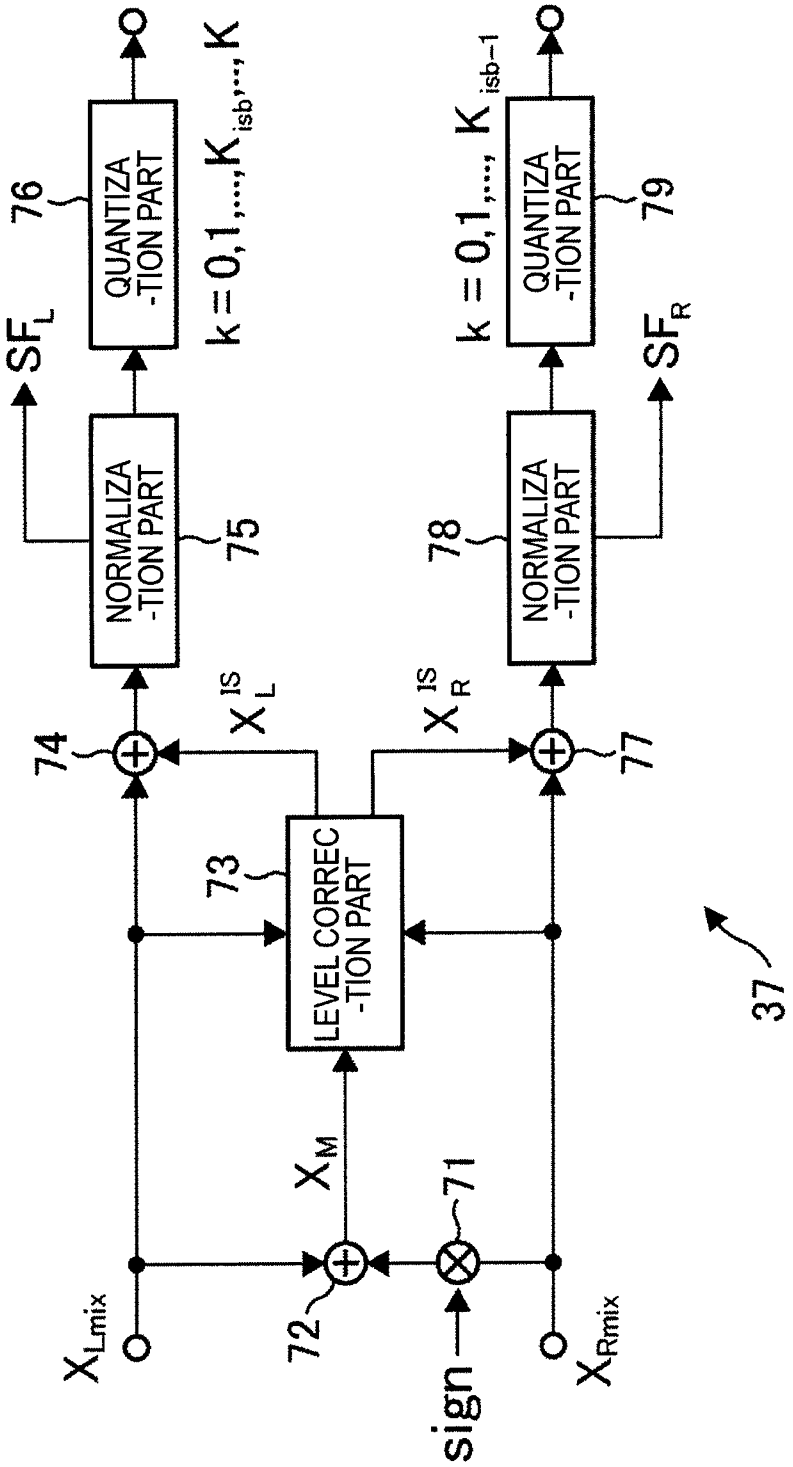
FIG. 8 is a block diagram illustrating a constitutional example of an encoding part in FIG. 2.

FIG. 8 is a block diagram illustrating a constitutional example of the encoding part 37 in FIG. 2.

The encoding part 37 in FIG. 8 is configured to include a multiplication part 71, an operation part 72, a level correction part 73, an addition part 74, a normalization part 75, a quantization part 76, an addition part 77, a normalization part 78 and a quantization part 79.

From among the frequency spectra $X_{Lmix}$ and $X_{Rmix}$ supplied from the adaptive mixing part 36 in FIG. 2, frequency spectra $X_{Lmix}$ and frequency spectra $X_{Rmix}$ which have frequency indices smaller than the frequency index $K_{isb}$ of the frequency $F_{IS}$, which is smallest in the starting band, are supplied to the addition part 74 and the addition part 77, respectively.

On the other hand, from among the frequency spectra $X_{Lmix}$ and $X_{Rmix}$ supplied from the adaptive mixing part 36, frequency spectra $X_{Lmix}$ which have frequency indices equal to or greater than the frequency index $K_{isb}$ are supplied to the operation part 72, the level correction part 73 and the addition part 74, and frequency spectra $X_{Rmix}$ which have frequency indices equal to or greater than the frequency index $K_{isb}$ are supplied to the multiplication part 71, the level correction part 73 and the addition part 77.

The multiplication part 71 and the operation part 72 generate a common spectrum $X_M$ common to the frequency spectrum $X_{Lmix}$ and the frequency spectrum $X_{Rmix}$ of each of the frequency indices equal to or greater than the frequency index $K_{isb}$ according to the following equation (9).

$$X_M(k)=0.5\times\{X_{Lmix}(k)+\text{sign}\times X_{Rmix}(k)\}(k\geq K_{isb}) \quad (9)$$

In equation (9), $X_M$(k), $X_{Lmix}$(k) and $X_{Rmix}$(k) represent the common spectrum $X_M$, the frequency spectrum $X_{Lmix}$, the frequency spectrum $X_{Rmix}$ which have a frequency index k, respectively. Moreover, sign is a phase polarity of the frequency spectrum $X_{Rmix}$ for each quantization unit and +1 or −1. For example, when a correlation of frequency spectra $X_{Lmix}$ and $X_{Rmix}$ for a quantization unit is a plus value the phase polarity sign is +1, and when it is a negative value the phase polarity sign is −1.

In more detail, the multiplication part 71 multiplies the frequency spectrum $X_{Rmix}$ of the frequency index equal to or greater than the frequency index $K_{isb}$ by the phase polarity sign to supply the resulting frequency spectrum to the operation part 72.

The operation part 72 adds the frequency spectrum $X_{Lmix}$ of the frequency index equal to or greater than the frequency index $K_{isb}$ and the frequency spectrum supplied from the multiplication part 71, and multiplies the resulting frequency spectrum by 0.5 to generate the common spectrum $X_M$. The operation part 72 supplies the generated common spectrum $X_M$ to the level correction part 73.

The level correction part 73 corrects, for each quantization unit, the level of the common spectrum $X_M$ so that the energy of the common spectrum $X_M$ supplied from the operation part 72 is coincident with the energy, for the quantization unit, of the frequency spectrum $X_{Lmix}$ of the frequency index equal to or greater than the frequency index $K_{isb}$. Similarly, the level correction part 73 corrects the level of the common spectrum $X_M$ so that the energy of the common spectrum $X_M$ is coincident with the energy, for the quantization unit, of the frequency spectrum $X_{Rmix}$ of the frequency index equal to or greater than the frequency index $K_{isb}$.

Specifically, at first, the level correction part 73 calculates energies $E_L(q)$ and $E_R(q)$, for a quantization unit q, of the frequency spectra $X_{Lmix}$ and $X_{Rmix}$ of the frequency index equal to or greater than frequency index $K_{isb}$, respectively, and energy $E_M(q)$ of the common spectrum $X_M$. Then, the level correction part 73 corrects, for each quantization unit q, the level of the common spectrum $X_M$ using the energy $E_L(q)$ or $E_R(q)$, and the energy $E_M(q)$ according to the following equation (10).

$$X_L^{IS}(k) = X_M(k) \times \sqrt{\frac{E_L(q)}{E_M(q)}} \quad (k \in q) \tag{10}$$

$$X_R^{IS}(k) = X_M(k) \times \sqrt{\frac{E_R(q)}{E_M(q)}} \quad (k \in q)$$

In equation (10), $X_M(k)$, $X_L^{Is}(k)$, and $X_R^{IS}(k)$ represent the common spectrum $X_M$, the common spectrum $X_L^{IS}$ after the level correction, and the common spectrum $X_R^{IS}$ after the level correction of a frequency index k, respectively.

The level correction part 73 supplies the common spectrum $X_L^{IS}$ after the level correction to the addition part 74 and the common spectrum $X_R^{IS}$ after the level correction to the addition part 77.

The addition part 74 adds the frequency spectra $X_{Lmix}$ of the frequency indices smaller than the frequency index $K_{isb}$ and the common spectra $X_L^{IS}$ supplied from the level correction part 73 to supply the resulting frequency spectrum of the total frequency indices to the normalization part 75.

The normalization part 75 normalizes the frequency spectrum supplied from the addition part 74 for each quantization unit with a predetermined frequency bandwidth using a normalization factor (scale factor) $SF_L$ in response to an amplitude of the frequency spectrum. The normalization part 75 supplies the frequency spectrum $X_L^{Norm}$ obtained by the normalization to the quantization part 76 and supplies the normalization factor $SF_L$ as additional information regarding the encoding to the multiplexer 38 in FIG. 2.

The quantization part 76 quantizes the frequency spectrum $X_L^{Norm}$ supplied from the normalization part 75 with a predetermined bit number to supply the frequency spectrum $X_L^{Norm}$ after the quantization as an encoded spectrum of the channel for the left to the multiplexer 38. Thereby, frequency indices k of the encoded spectrum supplied to the multiplexer 38 as the encoded spectrum of the channel for the left are coincident with the total frequency indices (0, 1, . . . , $K_{isb}$, . . . , K).

Moreover, the addition part 77 adds the frequency spectra $X_{Rmix}$ of the frequency indices smaller than the frequency index $K_{isb}$ and the common spectra $X_R^{IS}$ supplied from the level correction part 73 to supply the resulting frequency spectrum of the total frequency indices to the normalization part 78.

The normalization part 78 normalizes the frequency spectrum supplied from the addition part 77 for each quantization unit using a normalization factor $SF_R$ in response to an amplitude of the frequency spectrum. The normalization part 75 supplies the frequency spectrum $X_R^{Norm}$ obtained by the normalization to the quantization part 79 and supplies the normalization factor $SF_R$ as additional information regarding the encoding to the multiplexer 38.

The quantization part 79 quantizes, in the frequency spectrum $X_R^{Norm}$ supplied from the normalization part 78, the frequency spectra $X_R^{Norm}$ of the frequency indices smaller than the frequency index $K_{isb}$ with a predetermined bit number. The quantization part 79 supplies the frequency spectrum $X_R^{Norm}$ after the quantization as an encoded spectrum of the channel for the right to the multiplexer 38. Thereby, frequency indices k of the encoded spectrum of the channel for the right supplied to the multiplexer 38 are coincident with frequency indices (0, 1, . . . , $K_{isb-1}$) smaller than the frequency index $K_{isb}$ from among the total frequency indices.

Although, in the encoding part 37 in FIG. 8, the frequency indices k of the encoded spectrum of the channel for the left are the total frequency indices and the frequency indices k of the encoded spectrum of the channel for the right are the ones smaller than $K_{isb}$, the frequency indices k of the channel for the left may displace the ones of the channel for the right. That is, the frequency indices k of the encoded spectrum of the channel for the right may be the total frequency indices and the frequency indices k of the encoded spectrum of the channel for the left may be the ones smaller than $K_{isb}$.

(Explanation of Processing of Audio Encoder)

Figure 9:
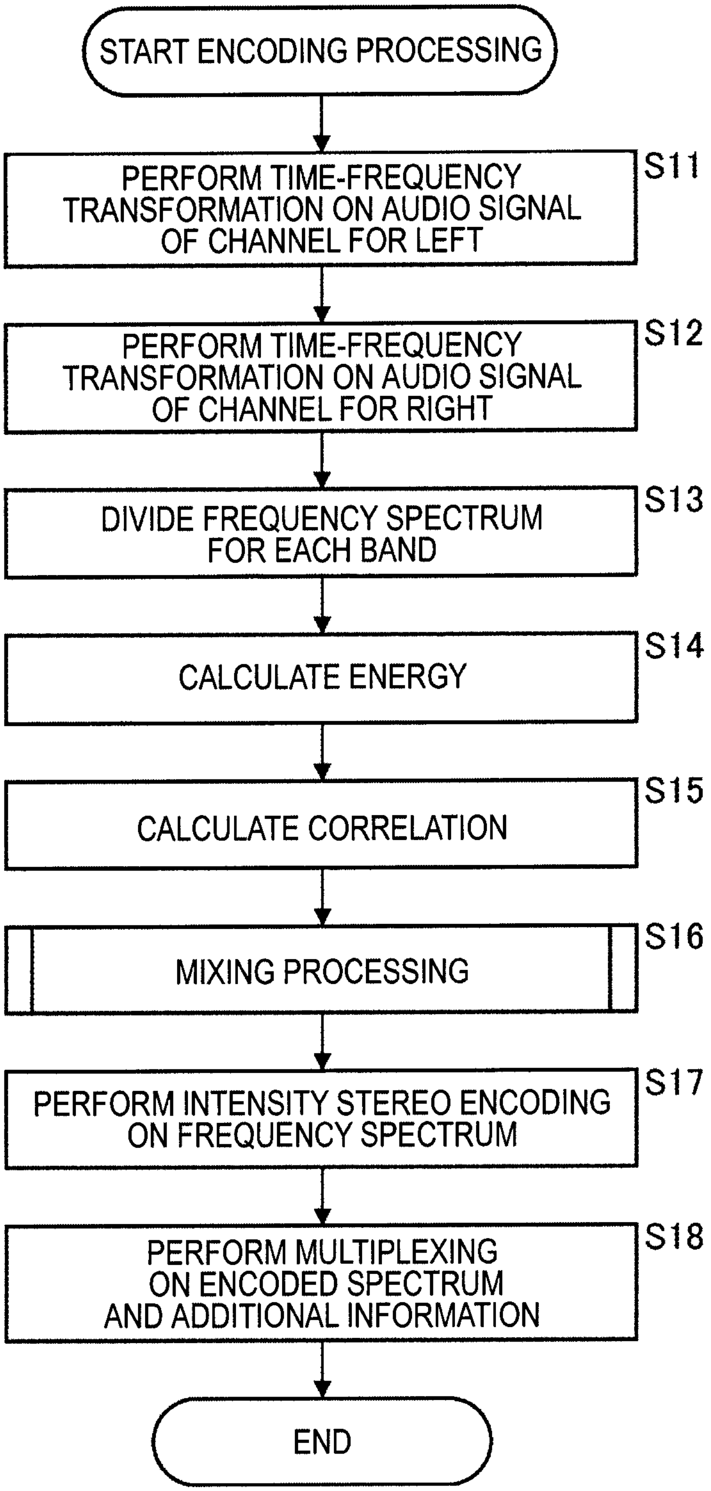
FIG. 9 is a flowchart for explaining encoding processing.

FIG. 9 is a flowchart for explaining encoding processing of the audio encoder 30 in FIG. 2. This encoding processing is initiated when the audio signal $x_L$ is inputted to the input terminal 31 and the audio signal $x_R$ is inputted to the input terminal 32.

In step S11 in FIG. 9, the T/F transformation part 33 performs time-frequency transformation on the audio signal $x_L$ of the channel for the left supplied from the input terminal 31 for each predetermined transformation frame. The T/F transformation part 33 supplies the resulting frequency spectrum $X_L$ to the correlation/energy calculation part 35 and the adaptive mixing part 36.

In step S12, the T/F transformation part 34 performs the time-frequency transformation on the audio signal $x_R$ of the channel for the right supplied from the input terminal 32 for each predetermined transformation frame. The T/F transformation part 34 supplies the resulting frequency spectrum $X_R$ to the correlation/energy calculation part 35 and the adaptive mixing part 36.

In step S13, the correlation/energy calculation part 35 divides each of the frequency spectrum $X_L$ supplied from the T/F transformation part 33 and the frequency spectrum $X_R$ supplied from the T/F transformation part 34 into pieces for respective bands.

In step S14, the correlation/energy calculation part 35 calculates the energy $E_L(b)$ and the energy $E_R(b)$ for each band according to the above-mentioned equation (1) to supply to the adaptive mixing part 36.

In step S15, the correlation/energy calculation part 35 calculates the correlation corr(b) for each band using the energy $E_L(b)$ and the energy $E_R(b)$ according to the above-mentioned equation (2) and holds them. Then, the correlation/energy calculation part 35 sequentially calculates the average correlation ave_corr(b) by calculating the exponentially weighted average of the correlation corr(b) of the present transformation frame and the correlations corr(b) of the predetermined number of past transformation frames according to the above-mentioned equation (3) to supply to the adaptive mixing part 36.

In step S16, the adaptive mixing part 36 performs mixing processing of mixing the frequency spectrum $X_L$ and the frequency spectrum $X_R$ for each band and each channel based on the average correlation ave_corr(b), the energy $E_L$(b) and the energy $E_R$(b). This mixing processing will be described in detail, referring to FIG. 10 mentioned below.

In step S17, the encoding part 37 performs the intensity stereo encoding on the frequency spectrum $X_{Lmix}$ and the frequency spectrum $X_{Rmix}$ supplied from the adaptive mixing part 36 to supply the resulting encoded spectrum to the multiplexer 38.

In step S18, the multiplexer 38 performs multiplexing of the encoded spectrum, additional information regarding the encoding, and the like supplied from the encoding part 37 in a predetermined format to output the resulting encoded data via the output terminal 39. Then, the encoding processing terminates.

Figure 10:
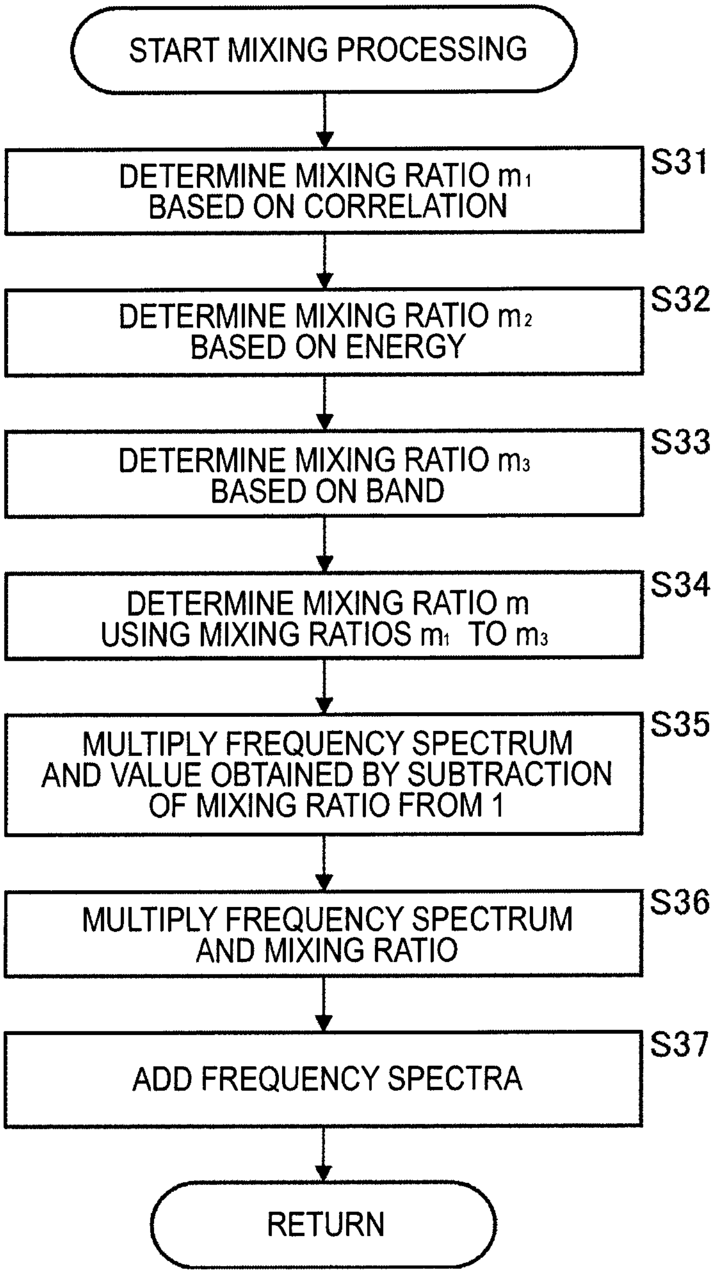
FIG. 10 is a flowchart for explaining mixing processing in FIG. 9 in detail.

FIG. 10 is a flowchart for explaining the mixing processing in step S16 in FIG. 9 in detail.

In step S31 in FIG. 10, the determination part 51 (FIG. 4) of the adaptive mixing part 36 determines the mixing ratio $m_1$(ave_corr(b)) as illustrated in FIG. 5 for each band based on the average correlation ave_corr(b) supplied from the correlation/energy calculation part 35.

In step S32, the determination part 51 determines the mixing ratio $m_2$(LR_ratio(b)) as illustrated in FIG. 6 for each band based on the energy $E_L$(b) and the energy $E_R$(b) supplied from the correlation/energy calculation part 35.

In step S33, the determination part 51 determines the mixing ratio $m_3$(b) as illustrated in FIG. 7 for each band based on the frequencies of the individual bands.

In step S34, the determination part 51 determines the mixing ratio m(b) for each band based on the mixing ratio $m_1$(ave_corr(b)), the mixing ratio $m_2$(LR_ratio(b)) and the mixing ratio $m_3$(b) according to the above-mentioned equation (7) or equation (8). The determination part 51 supplies the calculated mixing ratio m(b) to the multiplication part 52, the multiplication part 53, the multiplication part 55 and the multiplication part 56.

In step S35, the multiplication part 52 multiplies, for each band, the frequency spectrum $X_L$ supplied from the T/F transformation part 33 in FIG. 2 and a value obtained by subtraction of the mixing ratio m(b) supplied from the determination part 51 from 1 to supply the resulting frequency spectrum to the addition part 54. Moreover, the multiplication part 56 multiplies, for each band, the frequency spectrum $X_R$ supplied from the T/F transformation part 34 in FIG. 2 and a value obtained by subtraction of the mixing ratio m(b) supplied from determination part 51 from 1 to supply the resulting frequency spectrum to the addition part 57.

In step S36, the multiplication part 53 multiplies, for each band, the frequency spectrum $X_R$ supplied from the T/F transformation part 34 and the mixing ratio m(b) supplied from the determination part 51 to supply the resulting frequency spectrum to the addition part 54. Moreover, the multiplication part 55 multiplies, for each band, the frequency spectrum $X_L$ supplied from the T/F transformation part 33 and the mixing ratio m(b) supplied from the determination part 51 to supply the resulting frequency spectrum to the addition part 57.

In step S37, the addition part 54 adds, for each band, the frequency spectrum supplied from the multiplication part 52 and the frequency spectrum supplied from the multiplication part 53. The addition part 54 supplies the resulting frequency spectrum as the frequency spectrum $X_{Lmix}$ after the mixing to the encoding part 37 in FIG. 2. Moreover, the addition part 57 adds, for each band, the frequency spectrum supplied from the multiplication part 55 and the frequency spectrum supplied from the multiplication part 56. The addition part 57 supplies the resulting frequency spectrum as the frequency spectrum $X_{Rmix}$ after the mixing to the encoding part 37. Then, the processing returns to step S16 in FIG. 9 and proceeds to step S17.

As mentioned above, since the audio encoder 30 determines the mixing ratio m(b) based on the frequency spectra $X_L$ and $X_R$ of the stereo audio signals of the encoding object, the mixing ratio m(b) is adapted to features of the stereo audio signals of the encoding object. As a result, the deterioration of sound quality such as the occurrence of the noise and the sound leakage due to the encoding can be prevented.

Figure 1:
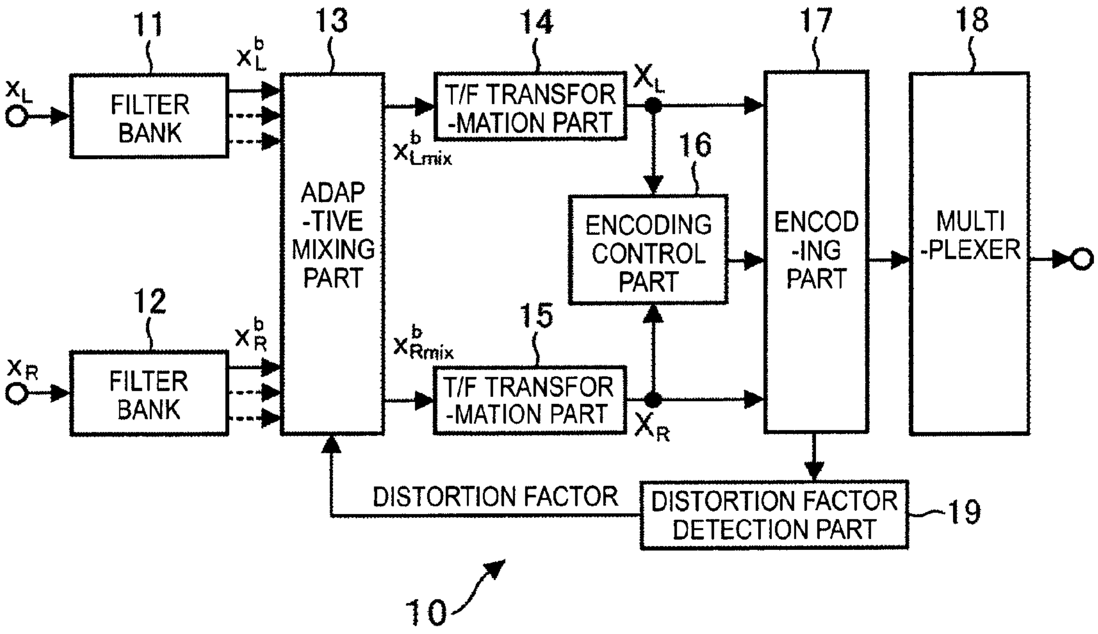
FIG. 1 is a block diagram illustrating one example of a configuration of an audio encoder of the past.

Moreover, since the audio encoder 30 mixes not the audio signals $X_L$ and $x_R$ but the frequency spectra $X_L$ and $X_R$ for each band, it does not need the filter banks 11 and 12 for the division into bands unlike the audio encoder 10 in FIG. 1. And in addition, an amount of operations and memory usage in encoding processing can be reduced.

(Explanation of Computer to which the Present Technology is Applied)

Next, a series of the processing as mentioned above can be performed by either hardware or software. When the series of the processing is performed by software, a program constituting the software is installed in a general purpose computer or the like.

Figure 11:
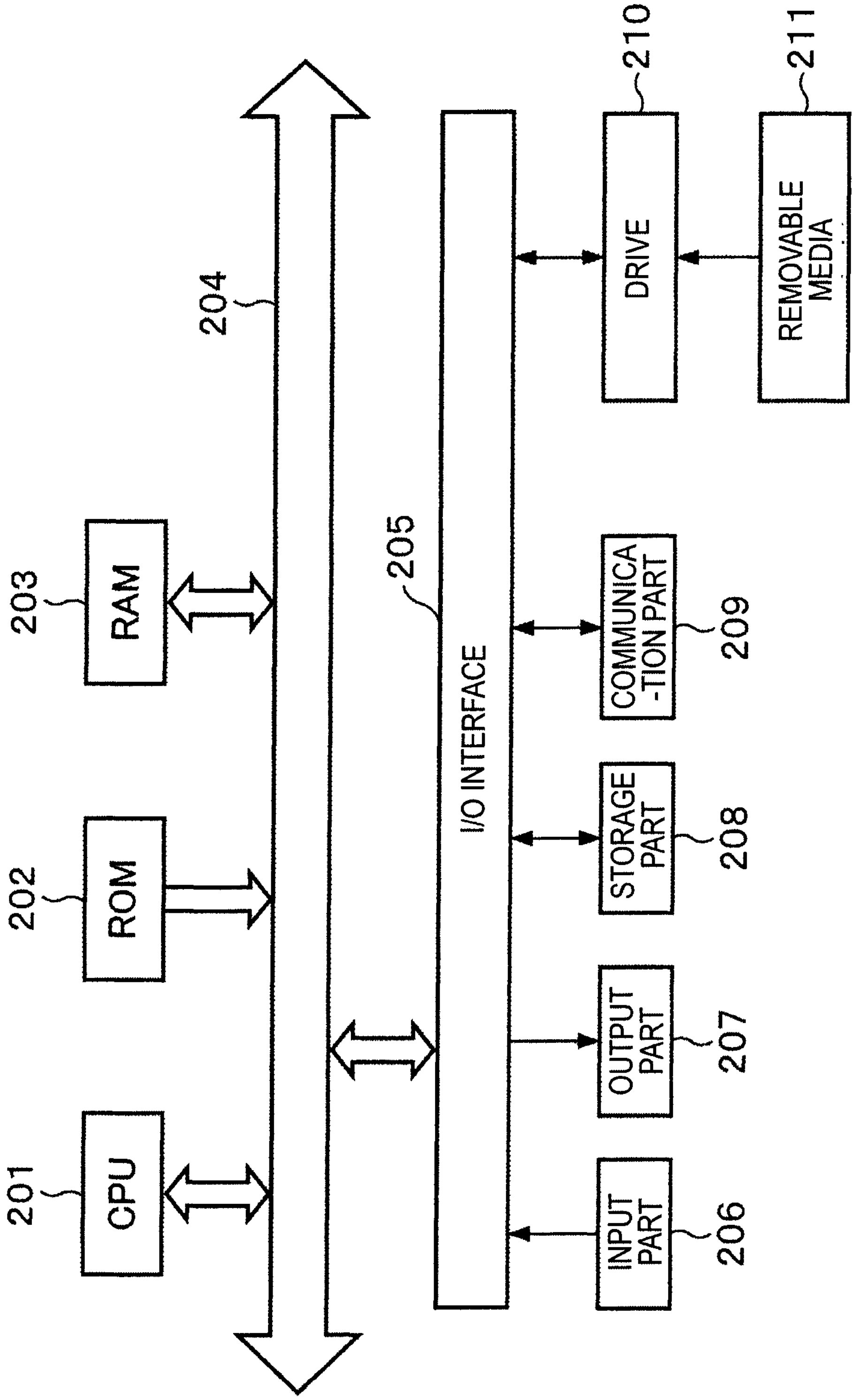
FIG. 11 is a diagram illustrating a constitutional example of one embodiment of a computer.

Thus, FIG. 11 illustrates a constitutional example according to one embodiment of a computer in which a program performing the above-mentioned series of processing is installed.

The program can previously be stored in a storage part 208 or an ROM (Read Only Memory) 202 as a recording medium built in a computer.

Or the program can be stored (recorded) in a removable medium 211. Such removable medium 211 can be provided as so-called package software. Here, as the removable medium 211 is, for example, a flexible disk, a CD-ROM (Compact Disc Read Only Memory), an MO (Magneto-Optical) disk, a DVD (Digital Versatile Disc), a magnetic disk, a semiconductor memory, or the like.

In addition, the program can be installed in the computer via a drive 210 from the removable medium 211 as mentioned above, or can be downloaded in the computer via a communication network or a broadcast network to be installed in the built-in storage part 208. That is, the program can be transferred to the computer by wireless communications, for example, via satellites for digital satellite broadcasting from download sites, or can be transferred to the computer by wired communications via a network such as an LAN (Local Area Network) and the Internet.

The computer includes a CPU (Central Processing Unit) 201 inside and to the CPU 201, an I/O interface 205 is connected via a bus 204.

When the CPU 201 receives commands inputted from a user via the I/O interface 205 by operations of an input part 206, according to the commands, it executes the program stored in the ROM 202. Or the CPU 201 loads the program stored in the storage part 208 in an RAM (Random Access Memory) 203 to execute it.

Thereby, the CPU 201 performs processing according to the above-mentioned flowcharts or processing which is performed according to the configuration of the above-mentioned block diagrams. Then, the CPU 201 outputs the processing result, for example, from an output part 207 via the I/O interface 205 as necessary, or transmits it from a communication part 209, and in addition, records it in the storage part 208 or the like.

In addition, the input part 206 is configured to include a keyboard, a mouse, a microphone and the like. Moreover, the output part 207 is configured to include an LCD (Liquid Crystal Display), loudspeaker and the like.

Here, in the present specification, the processing which the computer performs according to the program is not necessarily performed chronologically in the order in which the flowcharts indicate. That is, the processing which the computer performs according to the program also includes processes performed in parallel or individually (for example, in parallel processing or object-oriented processing).

Moreover, the program may be processed by one computer (processor), or may be performed by plural computers in a distributed processing manner. Further, the program may be transferred to a remote computer to be executed.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An audio encoder including:

a determination part determining, based on frequency spectra of audio signals of a plurality of channels, a mixing ratio as a ratio, relative to a frequency spectrum after mixing for each channel of the plurality of channels, of the frequency spectrum for another channel;

a mixing part mixing the frequency spectra of the plurality of channels for each channel based on the mixing ratio determined by the determination part; and an encoding part encoding the frequency spectra of the plurality of channels after mixing by the mixing part.

(2) The audio encoder according to (1), wherein the determination part determines the mixing ratio based on a correlation between the frequency spectra of the plurality of channels.

(3) The audio encoder according to (2), wherein the determination part determines the mixing ratio in a manner that the mixing ratio becomes larger as the correlation is closer to 0 and the mixing ratio becomes smaller as the correlation is closer to −1.

(4) The audio encoder according to (2) or (3), wherein the determination part determines that the mixing ratio is 0 when the correlation is smaller than a predetermined negative threshold value which is larger than −1.

(5) The audio encoder according to any one of (1) to (4), wherein the determination part determines the mixing ratio based on a level ratio between the frequency spectra of the plurality of channels.

(6) The audio encoder according to (5), wherein the determination part determines the mixing ratio in a manner that the mixing ratio becomes smaller as the level ratio is larger.

(7) The audio encoder according to (5) or (6), wherein the determination part determines that the mixing ratio is 0 when a level of the frequency spectrum of at least one channel of the plurality of channels is smaller than a predetermined threshold value, and determines the mixing ratio based on the level ratio when levels of all the frequency spectra of the plurality of channels are equal to or more than the predetermined threshold value.

(8) The audio encoder according to (5), wherein the determination part determines the mixing ratio based on an energy ratio between the frequency spectra of the plurality of channels.

(9) The audio encoder according to any one of (1) to (8), wherein the determination part divides the individual frequency spectra of the plurality of channels into pieces for respective predetermined frequency bands, and determines the mixing ratio for each frequency band based on the frequency spectra of the plurality of channels for each frequency band, and the mixing part mixes the frequency spectra of the plurality of channels for each channel and each frequency band based on the mixing ratio for each frequency band determined by the determination part.

(10) The audio encoder according to (9), wherein the determination part determines the mixing ratio for each frequency band based on the frequency spectrum for each frequency band and a frequency of the frequency band.

(11) The audio encoder according to any one of (1) to (10), wherein the encoding part performs intensity stereo encoding on the frequency spectra of the plurality of channels after mixing by the mixing part.

(12) An audio encoding method including, by an audio encoder:

determining, based on frequency spectra of audio signals of a plurality of channels, a mixing ratio as a ratio, relative to a frequency spectrum after mixing for each channel of the plurality of channels, of the frequency spectrum for another channel;

mixing the frequency spectra of the plurality of channels for each channel based on the mixing ratio determined by processing of the determining step; and encoding the frequency spectra of the plurality of channels after mixing by processing of the mixing step.

(13) A program for causing a computer to execute:

determining, based on frequency spectra of audio signals of a plurality of channels, a mixing ratio as a ratio, relative to a frequency spectrum after mixing for each channel of the plurality of channels, of the frequency spectrum for another channel;

mixing the frequency spectra of the plurality of channels for each channel based on the mixing ratio determined by processing of the determining step; and encoding the frequency spectra of the plurality of channels after mixing by processing of the mixing step.

The present disclosure contains subject matter related to that disclosed in Japanese Priority Patent Application JP 2011-230330 filed in the Japan Patent Office on Oct. 20, 2011 and Japanese Priority Patent Application JP 2011-147421 filed in the Japan Patent Office on Jul. 1, 2011, the entire content of which is hereby incorporated by reference.

What is claimed is:

1. An audio encoder comprising:

a determination part configured to determine a mixing ratio as a ratio of a frequency spectra of audio signals of one channel of a plurality of channels, relative to a frequency spectrum for another channel of the plurality of channels;

a mixing part configured to mix the frequency spectra of the plurality of channels for each channel based on the mixing ratio determined by the determination part; and an encoding part configured to encode the frequency spectra of the plurality of channels after mixing by the mixing part, wherein the determination part determines the mixing ratio based on a level ratio between the frequency spectra of the plurality of channels.

2. The audio encoder according to claim 1, wherein the determination part determines the mixing ratio in a manner that the mixing ratio becomes smaller as the level ratio is larger.

3. The audio encoder according to claim 1, wherein the determination part determines that the mixing ratio is 0 when a level of the frequency spectrum of at least one channel of the plurality of channels is smaller than a predetermined threshold value, and determines the mixing ratio based on the level ratio when levels of all the frequency spectra of the plurality of channels are equal to or more than the predetermined threshold value.

4. The audio encoder according to claim 1, wherein the determination part determines the mixing ratio based on an energy ratio between the frequency spectra of the plurality of channels.

5. The audio encoder according to claim 1, wherein the determination part divides individual frequency spectra of the plurality of channels into pieces for respective predetermined frequency bands, and determines the mixing ratio for each frequency band based on the frequency spectra of the plurality of channels for each frequency band, and the mixing part mixes the frequency spectra of the plurality of channels for each channel and each frequency band based on the mixing ratio for each frequency band determined by the determination part.

6. The audio encoder according to claim 5, wherein the determination part determines the mixing ratio for each frequency band based on the frequency spectrum for each frequency band and a frequency of the frequency band.

7. The audio encoder according to claim 1, wherein the encoding part performs intensity stereo encoding on the frequency spectra of the plurality of channels after mixing by the mixing part.

8. An audio encoding method comprising:

determining a mixing ratio as a ratio of a frequency spectra of audio signals of one channel of a plurality of channels, relative to a frequency spectrum for another channel of the plurality of channels;

mixing the frequency spectra of the plurality of channels for each channel based on the mixing ratio determined by processing of the determining step; and encoding the frequency spectra of the plurality of channels after mixing by processing of the mixing step, wherein the mixing ratio is determined based on a level ratio between the frequency spectra of the plurality of channels.

9. A non-transitory computer-readable medium having embodied thereon a program, which when executed by a computer causes the computer to execute a method, the method comprising:

determining a mixing ratio as a ratio of a frequency spectra of audio signals of one channel of a plurality of channels, relative to a frequency spectrum for another channel of the plurality of channels;

mixing the frequency spectra of the plurality of channels for each channel based on the mixing ratio determined by processing of the determining step; and encoding the frequency spectra of the plurality of channels after mixing by processing of the mixing step, wherein the mixing ratio is determined based on a level ratio between the frequency spectra of the plurality of channels.

10. The audio encoding method according to claim 8, wherein the mixing ratio is determined in a manner that the mixing ratio becomes smaller as the level ratio is larger.

11. The audio encoding method according to claim 8, wherein the mixing ratio is determined to be 0 when a level of the frequency spectrum of at least one channel of the plurality of channels is smaller than a predetermined threshold value, and the mixing ratio is determined based on the level ratio when levels of all the frequency spectra of the plurality of channels are equal to or more than the predetermined threshold value.

12. The audio encoding method according to claim 8, wherein the mixing ratio is determined based on an energy ratio between the frequency spectra of the plurality of channels.

13. The audio encoding method according to claim 8, further comprising:

dividing individual frequency spectra of the plurality of channels into pieces for respective predetermined frequency bands, wherein the mixing ratio is determined for each frequency band based on the frequency spectra of the plurality of channels for each frequency band, and wherein the frequency spectra of the plurality of channels is mixed for each channel and each frequency band based on the determined mixing ratio for each frequency band.

14. The audio encoding method according to claim 13, wherein the mixing ratio is determined for each frequency band based on the frequency spectrum for each frequency band and a frequency of the frequency band.

15. The audio encoding method according to claim 8, wherein intensity stereo encoding is performed on the frequency spectra of the plurality of channels after mixing by processing of the mixing step.

16. The non-transitory computer-readable medium according to claim 9, wherein the mixing ratio is determined in a manner that the mixing ratio becomes smaller as the level ratio is larger.

17. The non-transitory computer-readable medium according to claim 9, wherein the mixing ratio is determined to be 0 when a level of the frequency spectrum of at least one channel of the plurality of channels is smaller than a predetermined threshold value, and the mixing ratio is determined based on the level ratio when levels of all the frequency spectra of the plurality of channels are equal to or more than the predetermined threshold value.

18. The non-transitory computer-readable medium according to claim 9, wherein the mixing ratio is determined based on an energy ratio between the frequency spectra of the plurality of channels.

19. The non-transitory computer-readable medium according to claim 9, wherein the executed method further comprises:

dividing individual frequency spectra of the plurality of channels into pieces for respective predetermined frequency bands, wherein the mixing ratio is determined for each frequency band based on the frequency spectra of the plurality of channels for each frequency band, and wherein the frequency spectra of the plurality of channels is mixed for each channel and each frequency band based on the determined mixing ratio for each frequency band.

20. The non-transitory computer-readable medium according to claim 19, wherein the mixing ratio is determined for each frequency band based on the frequency spectrum for each frequency band and a frequency of the frequency band.

21. The non-transitory computer-readable medium according to claim 9, wherein intensity stereo encoding is performed on the frequency spectra of the plurality of channels after mixing by processing of the mixing step.

* * * * *